United States Patent [19]

Knight

[11] Patent Number: 4,798,672

[45] Date of Patent: Jan. 17, 1989

[54] CHARCOAL WATER FILTER/STRAINER

[76] Inventor: Val R. Knight, 176 Ocean Ave., Apt. 5, Jersey City, N.J. 07305

[21] Appl. No.: 77,665

[22] Filed: Jul. 24, 1987

[51] Int. Cl.⁴ .......................................... B01D 27/02
[52] U.S. Cl. .................................. 210/282; 210/449
[58] Field of Search ............... 210/282, 287, 436, 449, 210/460

[56] References Cited

U.S. PATENT DOCUMENTS 788,742  5/1905  Weston .......................... 210/287 X
2,773,601 12/1956  Keller et al. ..................... 210/287 X Primary Examiner—Ivars Cintins
Attorney, Agent, or Firm—Richard L. Miller

[57] ABSTRACT

This device is designed to most effectively strain and filter water from faucets. Primarily, it consists of a cartridge with a rubber fitting that is received in a faucet. A pair of mesh screens are received in the cartridge for retaining foreign particles, and a pair of aeration discs are also provided along with activated charcoal for removing toxic substances.

3 Claims, 1 Drawing Sheet

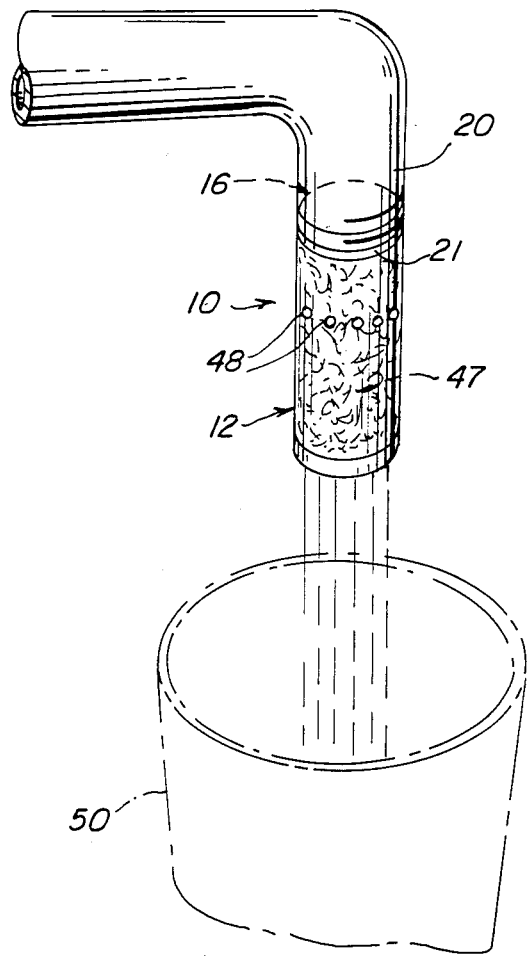
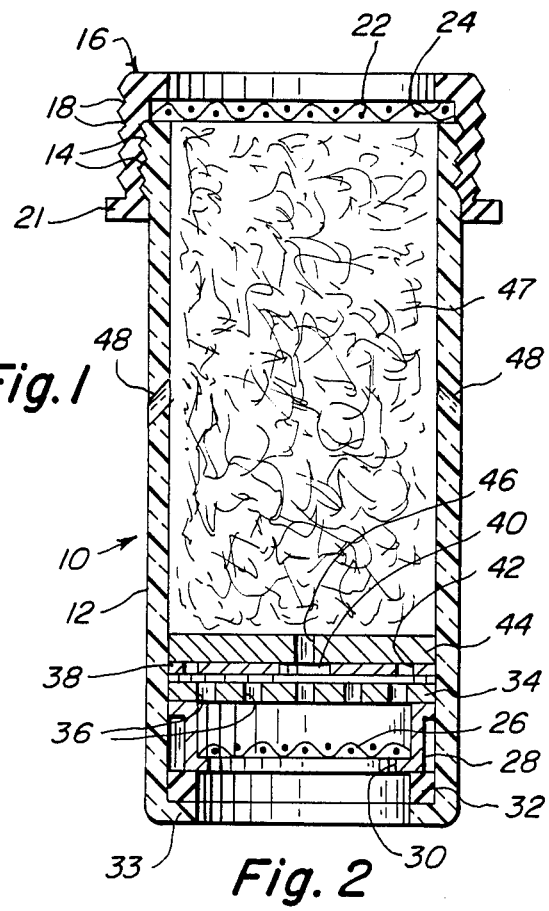
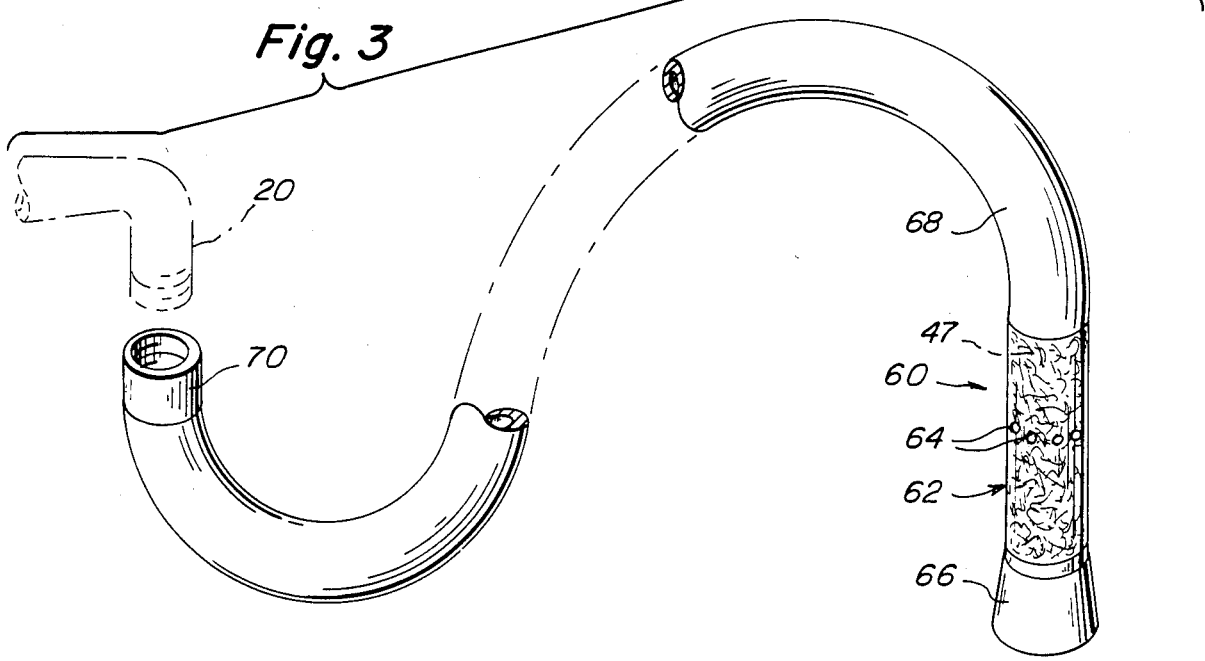

CHARCOAL WATER FILTER/STRAINER

BACKGROUND OF THE INVENTION

The instant invention relates generally to water purifying devices, and more particularly, to a charcoal water filter/strainer.

Numerous strainer devices have been provided in the prior art that are adapted to purify water. While these units may be suitable for the particular purpose to which they address, they would not be as suitable for the purpose of the present invention as hereafter described.

SUMMARY OF THE INVENTION

A primary object of the present invention is to provide a charcoal water filter/strainer that will overcome the shortcomings of the prior art devices.

Another object is to provide a charcoal water filter-strainer, which will be of such design, as to filter and aerate water in residences and the like.

An additional object is to provide a charcoal water filter/strainer, which will be a cartridge type for adaptation to faucets and other water outlets.

A further object is to provide a charcoal water filter/strainer that is simple and easy to use.

A still further object is to provide a charcoal water filter/strainer that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of the invention shown in operative use on a water faucet.

FIG. 2 is a greatly enlarged vertical cross sectional view of the invention per se shown removed from the water faucet.

FIG. 3 is a perspective view of a modified form of the invention.

DETAILED DESCRIPTION OF THE PREFERRED EMBODIMENTS

Turning now descriptively to the drawings, in which like reference characters denote like elements throughout the several views, a device 10 is shown to include a clear plastic cartridge 12 of cylindrical configuration. External threads 14 are provided on the upper end of cartridge 12 and engaged with similar threads internal of a rubber sleeve fitting 16. A plurality of external threads 18 are provided on fitting 16, for engagement of the interior of a faucet 20, so as to retain device 10 in faucet 20 for operative use.

A projecting flange 21 is integrally attached to fitting 16, so as to serve as a stop against further inward travel of fitting 16, and a first mesh screen 22 engages with the upper end of cartridge 12, and also engages with a shoulder 24 in the mouth of fitting 16. A second mesh screen 26 is provided in the bottom of cartridge 12 and is received and fixedly secured in the bottom of a screen housing 28. An opening 30 is provided through the housing 28 for water flow from screen 26, and housing 28 engages with a rubber ring 32 that shoulders against an inner annular flange 33 integrally attached to the bottom end of cartridge 12. A first aeration disc 34 is provided with a plurality of spaced openings 36 and a second aeration disc 38 with spaced openings 40 and 42, is spaced from aeration disc 34 and is fixedly secured to the inner periphery of cartridge 12.

A separation disc 44 engages with disc 34 and includes an opening 46 centrally therethrough for the passage of water, and activated charcoal 47 fills the upper portion of cartridge 12 to first mesh screen 22. A plurality of angularly disposed opening 48 are provided through cartridge 12 for the entrance of air at some water pressures, and provide for a spray of water at other water pressures, for rising dishes, etc. In operation, after rotating device 10 into faucet 20, faucet 20 is turned on and water flows through fitting 16, through screen 22, through charcoal 46, through the opening 46 of the separator disk, through the aerator discs, 34 and 38, through the second screen 26, and out of device 10 into glass 50.

During the above, air is taken in through the openings 48 under low water pressure discharge, and during high water pressure discharge, water is expelled from the device 10 in an upward arcuate path, that may be easily regulated by the self-contained valve of the faucet 20.

Referring now to FIG. 3 of the drawing, a modified device 60 consists of a cartridge 62 with air openings 64 therethrough, for the entrance of air in a like manner as was described of the embodiment of FIGS. 1 and 2, as cartridge 62 is provided with like components with the exception, that an adjustable valve head 66 is secured to the output end for controlling the water flow therefrom, and also, a hose 68 is fitted to the input end of cartridge 62 and is coupled by an attached screw fitting 70 that is threaded onto faucet 20.

In operation, the function of modified device 60 is the same as that described of device 10, the only exception being that the adjustable valve head 66 is attached for water control and the hose 68 at the input is received on a faucet.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A charcoal water filter, comprising, a cylindrical cartridge, a rubber fitting secured to said cartridge, for rendering said cartridge secure in a water discharge outlet of a faucet, activated charcoal received in said cartridge, for removing toxic substances, a first mesh screen and a second mesh screen receiving said cartridge, for removing and retaining foreign particles from the water outlet, and a pair of aeration disks received in said cartridge for introducing oxygen into said water, and a plurality of openings angularly disposed and peripherally formed in said cartridge for entry of air into the interior of the cartridge at low water pressure discharge and to provide for a spray of water at high water pressure discharge with the water passing through said openings in an upward and arcuate path for rinsing articles, as well as out of a bottom of said cartridge.

2. A charcoal water filter device as set forth in claim 1, wherein said rubber fitting engages with one side of said first mesh screen and one end of said cartridge engages with another side of said first mesh screen, and said first mesh screen retains said activated charcoal in said cartridge at an input end, and a separator disc is received in said cartridge and confines said charcoal at said water outlet.

3. A charcoal water filter device as set forth in claim 2, wherein said pair of aeration discs are spaced apart, have openings for water and air passage and one of said discs is fixedly secured to an inner periphery of said cartridge, and said second mesh screen is fixedly secured in a housing within said cartridge, and said housing, engages with a rubber ring received in said outlet, and said rubber ring engages with an annular and inner flange integrally attached to said cartridge.

* * * * *